(12) United States Patent
Kluge et al.

(10) Patent No.: US 9,068,848 B2
(45) Date of Patent: Jun. 30, 2015

(54) PROVIDING COST INFORMATION ASSOCIATED WITH INTERSECTIONS

(75) Inventors: Sebastian Kluge, München (DE); Alexey Pryakhin, München (DE); Peter Kunath, München (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 336 days.

(21) Appl. No.: 13/188,332

(22) Filed: Jul. 21, 2011

(65) Prior Publication Data

US 2012/0029800 A1    Feb. 2, 2012

(30) Foreign Application Priority Data

Jul. 21, 2010 (EP) .................................. 10007578

(51) Int. Cl.
  *G08G 1/00* (2006.01)
  *G01C 21/32* (2006.01)
  *G01C 21/34* (2006.01)

(52) U.S. Cl.
  CPC ................ *G01C 21/32* (2013.01); *G01C 21/34* (2013.01)

(58) Field of Classification Search
  USPC ........................................ 701/117; 340/995.2
  See application file for complete search history.

(56) References Cited

U.S. PATENT DOCUMENTS

| | | | | |
|---|---|---|---|---|
| 6,401,027 B1 * | 6/2002 | Xu et al. | ......................... | 701/117 |
| 7,317,406 B2 * | 1/2008 | Wolterman | ..................... | 340/917 |
| 8,050,863 B2 * | 11/2011 | Trepagnier et al. | ............ | 701/514 |
| 8,090,523 B2 * | 1/2012 | Takeuchi et al. | ............... | 701/117 |
| 8,126,641 B2 * | 2/2012 | Horvitz | ........................... | 701/414 |
| 8,234,065 B2 * | 7/2012 | Harayama et al. | ............. | 701/446 |
| 8,321,125 B2 * | 11/2012 | Tengler et al. | ................ | 701/410 |
| 8,340,898 B2 * | 12/2012 | Currie et al. | ................... | 701/409 |
| 8,364,391 B2 * | 1/2013 | Nagase et al. | ................ | 701/400 |

(Continued)

FOREIGN PATENT DOCUMENTS

| | | | |
|---|---|---|---|
| EP | 0 803 707 A2 | | 10/1997 |
| EP | 1596162 A1 | * | 11/2005 |

(Continued)

OTHER PUBLICATIONS

Zi Zhang, Jian-Min Xu, "A dynamic route guidance arithmetic based on reinforcement learning," vol. 6, Publication Year: 2005, pp. 3607-3611.*

(Continued)

*Primary Examiner* — Tuan C. To
(74) *Attorney, Agent, or Firm* — O'Shea Getz P.C.

(57) ABSTRACT

A method and device for providing cost information associated with intersections of a road network are provided. Driving data indicative of at least one condition of a vehicle upon passage of the vehicle through a plurality of intersections are retrieved. For each intersection of the plurality of intersections, a set of feature values associated with the respective intersections is determined based on map data. Parameters of an intersection cost module are adjusted. The intersection cost module is configured to provide a cost value in response to a set of feature values associated with an intersection. The parameters of the intersection cost module are adjusted based on the received driving data and the sets of feature values determined for the plurality of intersections. The intersection cost module may also be used for route searches.

30 Claims, 13 Drawing Sheets

(56) References Cited

U.S. PATENT DOCUMENTS

| | | | |
|---|---|---|---|
| 8,688,372 B2* | 4/2014 | Bhogal et al. | 701/416 |
| 8,725,408 B2* | 5/2014 | Hochkirchen et al. | 701/410 |
| 8,886,453 B2* | 11/2014 | Cerecke et al. | 701/422 |
| 2003/0078729 A1* | 4/2003 | Ohdachi et al. | 701/211 |
| 2003/0236616 A1* | 12/2003 | Kawakami et al. | 701/209 |
| 2004/0052239 A1 | 3/2004 | Nesbitt | |
| 2004/0186663 A1* | 9/2004 | Irie | 701/211 |
| 2005/0021231 A1* | 1/2005 | Matsuda et al. | 701/211 |
| 2005/0273256 A1* | 12/2005 | Takahashi | 701/211 |
| 2008/0004789 A1 | 1/2008 | Horvitz et al. | |
| 2009/0052327 A1* | 2/2009 | Larsson et al. | 370/238 |
| 2009/0287402 A1* | 11/2009 | Liu et al. | 701/117 |
| 2009/0303077 A1* | 12/2009 | Onome et al. | 340/901 |
| 2009/0326751 A1* | 12/2009 | Otake et al. | 701/25 |
| 2010/0036599 A1* | 2/2010 | Froeberg et al. | 701/200 |
| 2010/0063731 A1* | 3/2010 | Milbert et al. | 701/211 |
| 2010/0153005 A1* | 6/2010 | Cerecke et al. | 701/201 |
| 2011/0153195 A1* | 6/2011 | Broadbent | 701/201 |

FOREIGN PATENT DOCUMENTS

| | | | |
|---|---|---|---|
| GB | 2431261 A | * | 4/2007 |
| WO | WO 2009/059572 A1 | | 5/2009 |

OTHER PUBLICATIONS

Ghedira, Mohamed Chedly, Ben-Ameur, W., Afifi, H., "A Novel Route Guidance Algorithm with Maximum Coverage and Minimum Handover for Vehicular Networks," Publication Year: 2008, pp. 692-697.*

Kantowitz, S.C., Kantowitz, B.H., Hanowski, R.J., "The Battelle Route Guidance Simulator: a low-cost tool for studying driver response to advanced navigation systems," Publication Year: 1995, pp. 104-109.*

* cited by examiner

PROVIDING COST INFORMATION ASSOCIATED WITH INTERSECTIONS

RELATED APPLICATIONS

This application claims priority from European Patent Application Serial Number 10 007 578.7, filed on Jul. 21, 2010, titled METHOD AND DEVICE FOR PROVIDING COST INFORMATION ASSOCIATED WITH JUNCTIONS AND METHOD OF DETERMINING A ROUTE, the subject matter of which is incorporated in its entirety by reference in this application.

BACKGROUND OF THE INVENTION

1. Field of the Invention

The present invention relates to a method and a device for providing cost information for junctions in a road network in a navigation system. The invention especially, but not exclusively, relates to providing cost information for junctions in vehicular navigation and use of that cost information in determining a route.

2. Related Art

Performing route searches on road network in a navigation unit has become increasingly important. Such route searches are typically performed based on map data in a map database that provides information on, inter alia, road segments, their connectivity, and possibly additional information such as the orientation and length of the road segment. Technically, road segments and intersections form a graph on which a route search is performed. To perform a route search, a least-cost search is typically performed on the graph based on a cost model. Different cost models may be employed to find routes that are optimized with regard to different quantities. For example, a cost model that provides information on the travel time associated with the different road segments in the road network may be used for a fastest route search. A cost model that provides information on the fuel consumption associated with the different road segments in the road network may be used for a search for a route having optimum fuel consumption. The cost information associated with the different road segments for the various cost models, such as fastest route, route having least fuel consumption etc., may also be provided in a database.

For various cost models, the costs associated with intersections may significantly affect the result of the route search. For illustration, waiting times at road junctions (or commonly called intersections) in an urban area may significantly add to the total costs in terms of time or fuel consumption that are associated with a route. When information on the costs associated with intersections are set by a human expert, the cost values may not correctly reflect the manifold types of intersections that exist and manoeuvres that may be performed therein. Storing individual cost values for intersections on a per intersection basis may significantly add to storage space requirements.

Accordingly, a need exists for providing cost information associated with junctions (intersections) and for methods of determining a route that utilizes such information. In particular, a need exists for an approach that accounts for the fact that there are many different types of intersections and possible actions performed in the intersections. A need also exists to keep the storage space required for providing the cost information associated with intersections at moderate levels.

SUMMARY OF THE INVENTION

Approaches for providing cost information for intersections of a road network in a navigation system are provided. In these approaches, parameters of an intersection cost model are adjusted. To this end, driving data that has been or is recorded upon passage of a vehicle through intersections are analyzed. Characteristics associated with the driving data, such as a number of times the vehicle has to stop at an intersection, a minimum speed upon passage through the intersection, a characteristic waiting time when stopping at an intersection, or similar, may be extracted from the driving data for intersections. A set of feature values may then be determined for each one of the different intersections based on map data. The set of feature values may be determined based on static map data and information on a particular action performed at the intersection, such as an incoming and outgoing link, while recording the driving data. For each one of intersections in a road network, characteristics of the driving data in combination with the associated set of feature values for the respective intersection may be utilized to adjust parameters of the intersection cost model. The parameters of the intersection cost model may be adjusted separate from onboard navigation, for example, using a stationary computer system. The parameters of the junction cost model may alternatively or additionally be adjusted onboard a vehicle.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be and advantages be included within this description, be within the scope of the invention, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
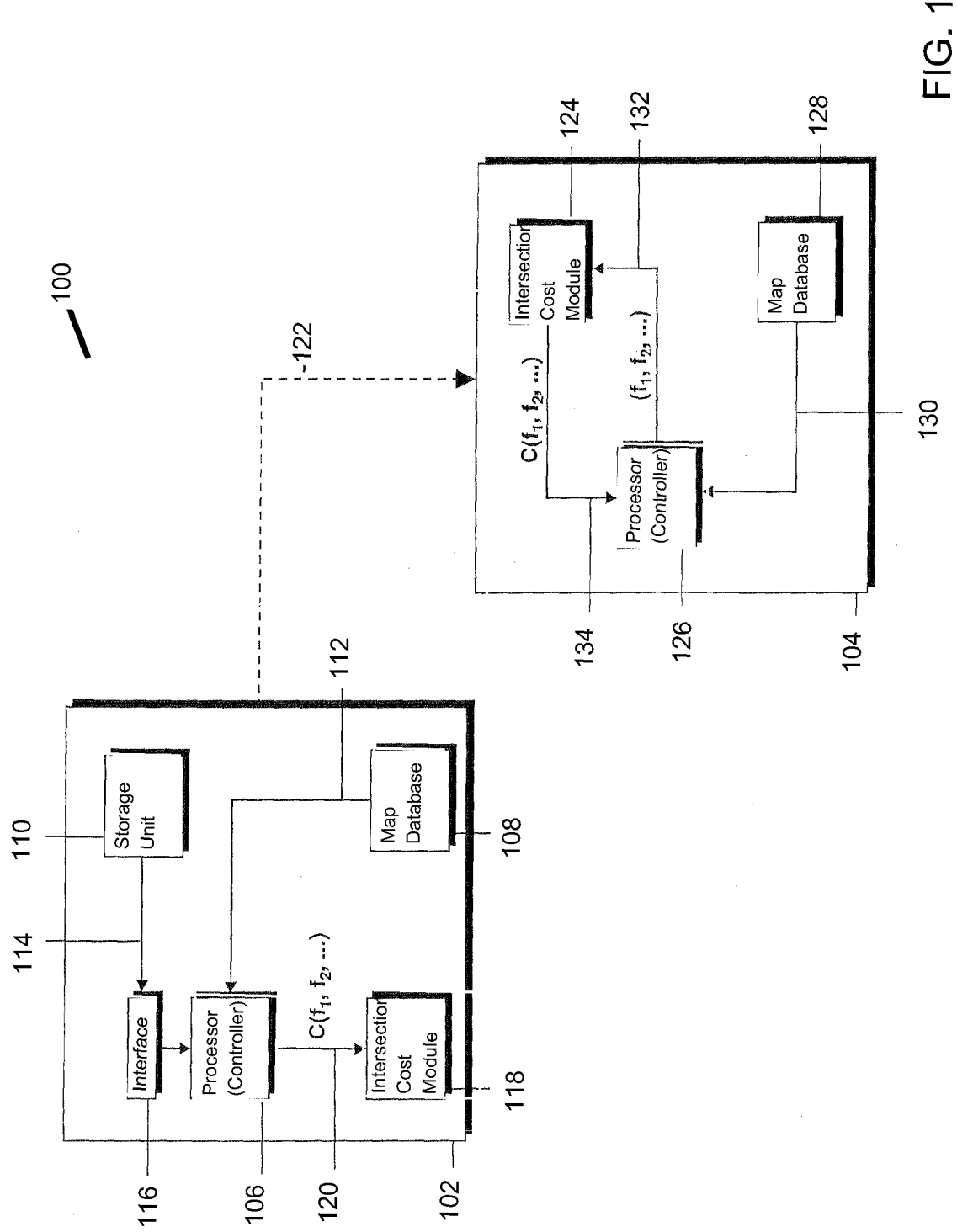
FIG. 1 is a schematic block diagram of a device for providing cost information for intersections and a navigation unit using a cost model in accordance with an example of an implementation of the invention.

In FIG. 1, a block diagram 100 of an electronic computing device 102 and of a navigation device 104 is shown. The computing device 102 adjusts parameters of an intersection cost model based on driving data and sets of feature values of intersections determined based on map data. The computing device 102 acts as computing device for providing cost information according to one example of an implementation of the invention. The navigation device 104 is adapted to be installed onboard a vehicle and utilizes the intersection cost model with the parameters adapted by the computing device 102.

The computing device 102 may include a processor 106 (microprocessor, digital signal processor, microcontroller, or an analog circuit functioning as a state machine), a map database 108 coupled to the processor 106 and a storage unit 110 (memory or memory chip) in which driving data are stored, for example as a historical log file. The map database 108 stores map data associated with a road network. For intersections in the road network, the map database 108 may include at least information on road segments connected to the respective intersections. The map database 108 may also include information on the road segments, which may include information on a classification of the road segments and directions of the road segments in proximity to the various intersections. The map database 108 may include additional information associated with the intersections of the road network, such as information on turning restrictions imposed at the intersection, the presence or absence of traffic lights at the various road segments, the names of cross roads, the lane connectivity or similar information.

The storage unit 110 may store driving data that represents information on a vehicle's condition upon passage through a plurality of intersections. The information stored in the storage unit 110 may include a speed profile and/or a fuel consumption rate of the vehicle recorded upon passage through intersections, as a function of time. Additional information may also be included in the information stored in the storage unit 110, such as time or position stamps. The position stamps may be position data obtained using a GPS or other positioning system while recording the speed profile and/or fuel consumption rate of the vehicle. The processor 102 may retrieve the driving data 114 from the storage unit 110 via an interface 116. The interface may be an electrical connection or a port such as, for example, a USB or serial port. The interface may also be a wireless network interface for receipt of data wirelessly. To this end, the processor 106 may output a request to the storage unit 110, which provides the driving data 114 to the processor 106 via interface 116.

The processor 106 may retrieve the map data 112, which may include information on an intersection from the map database 108 to establish a set of feature values for an intersection through which the vehicle has passed when recording the driving data. To this end, the processor 106 may output a request to the map database 108, which provides the information on the intersection. The processor 106 retrieves the driving data 114 from the storage unit 110. The processor 106 analyzes the map data 112 associated with an intersection through which the vehicle has passed to establish certain characteristics associated with the vehicle condition upon passage through this intersection. The processor 106 may determine a set of feature values associated with the intersection based on the map data 112. The processor 106 performs the analysis of the driving data 114 and determines or identifies an associated set of feature values based on the map data 112 for a plurality of different junctions to adjust parameters in a junction cost module 118.

The processor 106 may perform various procedures and tasks to adjust the parameters of the intersection cost module 102. The processor 106 may analyze the driving data 114 to identify an intersection based on a speed profile or fuel consumption rate of the vehicle. The processor 106 may then retrieve map data 112 associated with the intersection from the map database 108. The processor 106 may generate an n-tuple $(f_1, f_2, \ldots)$ of feature values (or characteristics) $f_1$, $f_2$, etc. that are associated with the respective intersections. The set of feature values does not need to be unique. All feature values of the n-tuple may be different from unique identifiers for an intersection, so that more than one intersection in the road network may have the same set of feature values. At least one of the feature values determined by the processor 106 may be determined based on road classes of road segments connected to the respective intersection. At least another one of the feature values determined by the processor 106 may be determined based on direction information on the road segments connected to the respective intersection, which may be retrieved from the map database 108 over a communication bus 112.

The processor 106 may generate an n-tuple $(f_1, f_2, f_3, \ldots)$ of feature values with n equal to or greater than 3. One of the feature values may represent a road class of an incoming road segment for the manoeuvre at the intersection represented by the driving data 114 retrieved from the storage unit. Another one of the feature values may represent a road class of an outgoing road segment for the manoeuvre at the junction represented by the retrieved driving data 114. Yet another one of the feature values may represent a direction change incurred upon passage through the intersection, such as an angle enclosed by the incoming and outgoing road segments. A discretization of the angle may be employed. For illustration, the angle may be discretized so that discrimination is made between going straight, right turn, left turn, and U-turn.

The set of feature values may also be determined in a more complex manner. For illustration, to account for dynamic traffic situations, traffic patterns associated with incoming and outgoing road segments may be determined. Information related to time and day may be utilized to determine the traffic patterns. Additionally or alternatively, traffic information signals may be utilized to determine the intersection feature values or to adjust these feature values. Examples for such traffic information signals such as traffic message channel (TMC) or Travel Protocol Expert Group (TPEG) messages. Data extracted from the traffic information signal may be used as a feature value or may be utilized to adjust another feature value, for example so as to account for traffic conditions broadcast in the traffic information signal.

The processor 106 may analyze the driving data 114 in various ways to establish one or more characteristics associated with the passage through an intersection based on the driving data 114. For illustration, the processor 106 may analyze the driving data 114 to identify a total time required for passage through the intersection. Alternatively or additionally, the processor 106 may analyze the driving data 114 to identify a total number of stops that the vehicle has undergone at the intersection prior to entering the outgoing road segment. Alternatively or additionally, the processor 106 may analyze the driving data 114 to identify a mean velocity upon passage through the intersection. Alternatively or additionally, the processor 106 may analyze the driving data 114 to identify a total fuel consumption incurred upon passage through the intersection. The latter quantity may be established, for example, based on a fuel consumption rate recorded as a function of time, or based on a speed profile in combination with a vehicle data. The determined quantity may be regarded to be a cost value associated with a specific intersection, which has been determined based on the recorded driving data. This measurement-based cost value in combination with the set of feature values associated with the intersection may be used to adjust the parameters of the intersection cost module 118.

The processor 106 may use different approaches to adjust parameters of the junction cost module 118. In one example, the processor 106 may perform a multi-dimensional regression analysis on the measurement-based cost values, determined based on the driving data 114, for different sets of feature values of the associated intersections, as determined based on the map data 112. For illustration, the processor 106 may determine a measurement-based cost value c(1) for passage through a first intersection by analysis of the driving data, a measurement-based cost value c(2) for passage through a second intersection by analysis of the driving data, etc. The values c(1), c(2), etc. may represent a time delay or fuel consumption incurred upon passage through the respective intersection. The processor 106 may further determine that the first intersection is associated with a set of feature values $(f_1(1), f_2(1), f_3(1))$ while the second intersection is associated with a set of feature values $(f_1(2), f_2(2), f_3(2))$ etc. The processor 106 may then perform a regression analysis to determine a function in the n-tuples of feature values which approximates the measurement-based cost values. The number of intersections for which driving data are analyzed may be selected so as to be greater than the number of possible different sets of feature values. For example, if the set of feature-values is a 3-tuple having the road class of the incoming road segment, the road class of the outgoing road segment, and a direction change discretized in 90° steps as entries, the number of intersections for which driving data are analyzed may be selected to be greater than the number of possible road classes squared, multiplied by four (indicating the possible direction changes).

The processor 106 may be operative to determine a parameter of the intersection cost module 118 based on the driving data and associated feature values of a plurality of intersections, i.e., data for plural intersections may respectively be processed to determine one parameter for use in the junction cost module 118.

In another example, the processor 106 may alternatively or additionally perform a simulation of the vehicle passage through the intersection, sampled, for example, over different waiting times prior to entering the outgoing road segment, different minimum speeds in the intersection area, or different outgoing speeds. The different waiting times or minimum speeds in the intersection area may respectively be selected according to a probability distribution that depends on the driving data 114 for intersections having a specific set of feature values $(f_1, f_2, \ldots)$. For each one of the simulations, a simulated cost value may be determined. The simulated cost value may represent, for example, a total time or total fuel consumption incurred upon the simulated passage through the intersection having the set of feature values $(f_1, f_2, \ldots)$. If the simulated cost value is total fuel consumption, the simulated cost value may be determined for example by simulating a speed profile upon passage through the intersection and determining the total fuel consumption based thereon using vehicle data. The simulated cost values determined in the different simulation runs may be averaged to determine the cost value for intersections having the set of feature values $(f_1, f_2, \ldots)$. The thus determined cost value is also measurement-based, as the probability distribution(s) used in simulating the passage through the intersection are set based on the driving data 114. The simulations may be performed for various sets of feature values $(f_1, f_2, \ldots)$, respectively based on the driving data 114 associated with intersections having this set of feature values or a similar set of feature values.

Irrespective of the specific implementation of determining the cost value, the processor 106 may also determine additional information on the statistical distribution of costs that have been incurred when travelling through intersections having a given set of feature values. For example, a variance or mean square deviation of costs from the mean value determined in a regression analysis or by performing plural simulations may be established. The information on the statistical distribution may be used to adjust parameters in the intersection cost module 118. For illustration, the intersection cost module 118 may include, for each n-tuple of feature values, not only information on a mean cost value but also information on a statistical distribution about the mean value, such as the variance. Both the mean value and the variance may be adjusted using the driving data 14. The information may be utilized to determine the variance of costs in a subsequent route search, which is performed by the intersection cost module. In yet other implementations, the processor 106 may perform other procedures to adjust parameters in the intersection cost module.

The intersection cost module 118 may be implemented in different ways. For illustration rather than limitation, the intersection cost module 118 may include a look-up table which respectively has a cost value entry for plural different sets of feature values. The processor 106 may determine the cost values associated with intersections having various sets of feature values $(f_1, f_2, \ldots)$, for example using regression analysis or vehicle passage simulations, and may overwrite or update entries in the look-up table within the intersection cost module 118 by writing new data 120 into the look-up table. If the entries in the look-up table are updated, a weighted average of the old entries of the look-up table and the cost values determined based on the new driving data 114 may be computed to generate the new cost values 120. The weighting factors may be determined based on the size of the data set that has formed the basis for the old entries in the look-up table and the size of the data set, e.g., the number of intersections in the driving data 114 having a specific set of feature values $(f_1, f_2, \ldots)$, which is processed to update the entries in the look-up table.

The intersection cost module 118 may also be implemented as a procedure or task in software or firmware. The processor 106 may be configured to adjust parameters of the procedure. The adjusted parameters may be coefficients of a polynomial in the feature values or similar. The Intersection cost module 118 may also include a simulation machine that simulates passage of a vehicle through an intersection having a specific set of feature values. The processor 106 may then be configured to adjust probability distributions for parameters used in simulation runs based on the characteristics of the driving data 114 determined by analyzing the driving data and the associated set of feature values. Such probability distributions may include probability distributions for incoming or outgoing speeds, waiting times, number of stops, minimum velocities in the intersection area.

For the various example of an implementations described above, the intersection cost module 118 is adapted based on driving data 114 indicative of a vehicle condition upon passage through an intersection and a set of feature values associated with the respective intersection, aggregated over different intersections. Thus, the established intersection cost module 118 may be accessed using a set of feature values associated with a given intersection as input, to retrieve a cost value associated with the given intersection from the intersection cost module 118. To this end, the intersection cost module 124 may be deployed to one or plural navigation devices 104, as illustrated by the broken line 122 in FIG. 1. The intersection cost module 124 may be deployed to the navigation device 104 as part of the software, firmware, or as part of a database of the navigation device 104. The navigation device 104 may be installed in various types of vehicles, which do not need to be identical to the vehicle used for recording the driving data stored in the storage unit 110.

The navigation device 104 may include a processor (similar to 106) 126, a map database 128 and the intersection cost module 124. The map database 128 may be identical to the map database 108 of the computing device 102, but does not required to be identical to the map database 108. The map database 128 may be configured so as to allow the processor 126 to respectively determine, for intersections in a road network, the classification of road segments connected to an intersection and the angles between the road segments at the intersection. Additional information may be included in the map database, such as information on turning restrictions, traffic lights located at various road segments at the intersection, lane connectivity or crossroad names.

When information on a cost value associated with an intersection is required, for example in a route search, the processor 126 may retrieve map data 130 for the intersection from the map database 128. Based on the map data 130, the processor 126 determines a set of feature values that are associated with the intersection. The set of feature values may be an n-tuple and may be determined identically to the set of feature values used when adjusting parameters in the intersection cost module 124. In one implementation, the processor 126 may generate an n-tuple $(f_1, f_2, f_3, \ldots)$ of feature values with n equal to or greater than 2, based on the map data 130. The feature values of the n-tuple may be such that they do not include a unique intersection identifier. i.e., plural different intersections in the road network may have the same n-tuple of feature values. One of the feature values may represent a road class of an incoming road segment for the manoeuvre on the intersection contemplated in the route search. Another one of the feature values may represent a road class of an outgoing road segment for the manoeuvre on the intersection contemplated in the route search. Yet another one of the feature values may represent a direction change incurred in the intersection contemplated in the route search, such as an angle enclosed by the incoming and outgoing road segments. A discretization of the angle may be employed. For illustration, the angle may be discretized so that a distinction is made between going straight, right turn, left turn, and U-turn. The processor 126 may query the map database 128 several times in order to generate the n-tuple of feature values. For illustration, names or identifiers of road segments may be retrieved from the map database 128 in a first query, and this information may subsequently be used to retrieve information on road classes and directions of the road segments in a second query.

The processor 126 may queries the intersection cost module 124, using the set of feature values 132 determined for an intersection as input. In response, a cost value 134 is received which is associated with intersections having the set of feature values 132. The cost value 1134 may be used, for example, for a route search from a starting point to a destination, for dynamical routing, or similar searching.

Adapting parameters in the intersection cost module 124 may be continued even after the intersection cost module 124 has been deployed to the navigation device 104. To this end, the navigation device 104 may monitor the behaviour of the vehicle in which it is installed during passage through an intersection, may establish the set of feature values 132 associated with the intersection based on the map data 130, and may update parameters of the intersection cost module 124 based on an analysis of the vehicle behaviour upon passage through the intersection and the set of feature values 132.

Figure 2:
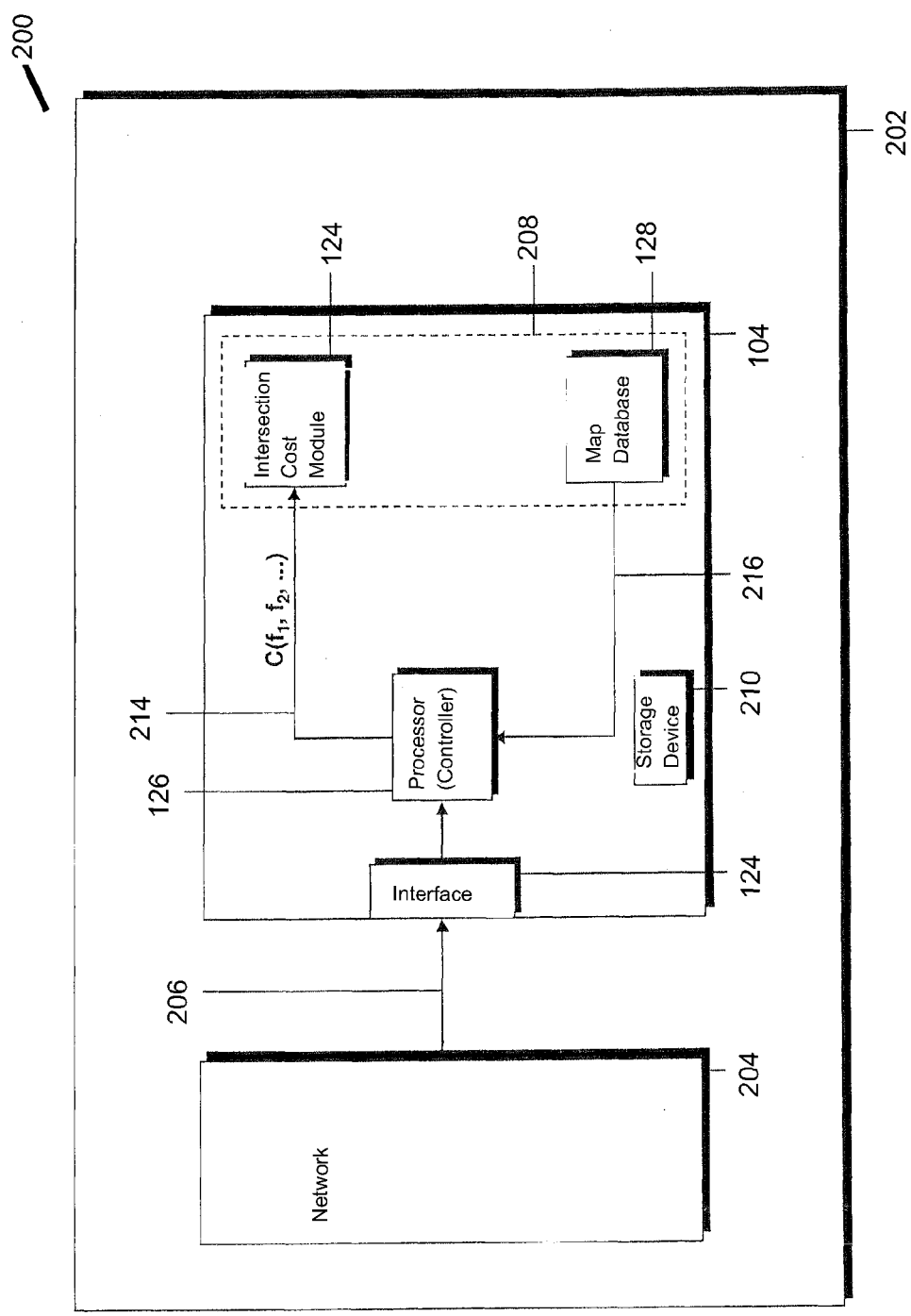
FIG. 2 is a schematic block diagram of a vehicle having a navigation unit of FIG. 1 when the navigation unit is operative to adjust parameters of an intersection cost model in accordance with an example of an implementation of the invention.

Turning to FIG. 2, a schematic block diagram 200 of a vehicle 202 having a navigation device 104 of FIG. 1 when the navigation device 104 is operative to adjust parameters of an intersection cost module in accordance with an example of an implementation of the invention. The vehicle 202 has a navigation device 104 and an on board network 204. The on board network 204 may include a CAN-bus coupled to the navigation device 104 to provide driving data 206 indicative of vehicle conditions to the navigation device 104 that may be operative to adjust parameters of an intersection cost module 124 in accordance with an example of an implementation of the invention.

The navigation device 104 includes a processor 126, a map database 128 and an intersection cost module 124. The map database 128 and intersection cost module 124 may be configured as described with reference to FIG. 1. The map database 128 may include information that allows the processor 126 to determine, for any intersection in the road network, a set of feature values. The set of feature values 214 may include information such as road segment classes and angles between road segments. The intersection cost module 124 may be configured such that a cost value for an intersection may be retrieved from the intersection cost module 124 when queried with a set of feature values. The map database 128 having map data 216 and intersection cost module 124 may include data stored in a storage device or memory 208 of the navigation device 104. A storage device 210, which may be formed integrally with the storage device 208, may store instructions which, when executed by the processor 126, direct the processor 126 to perform the adaptation of the intersection cost module 124 or the retrieving of cost values for intersections by querying the intersection cost module 124.

Figure 3:
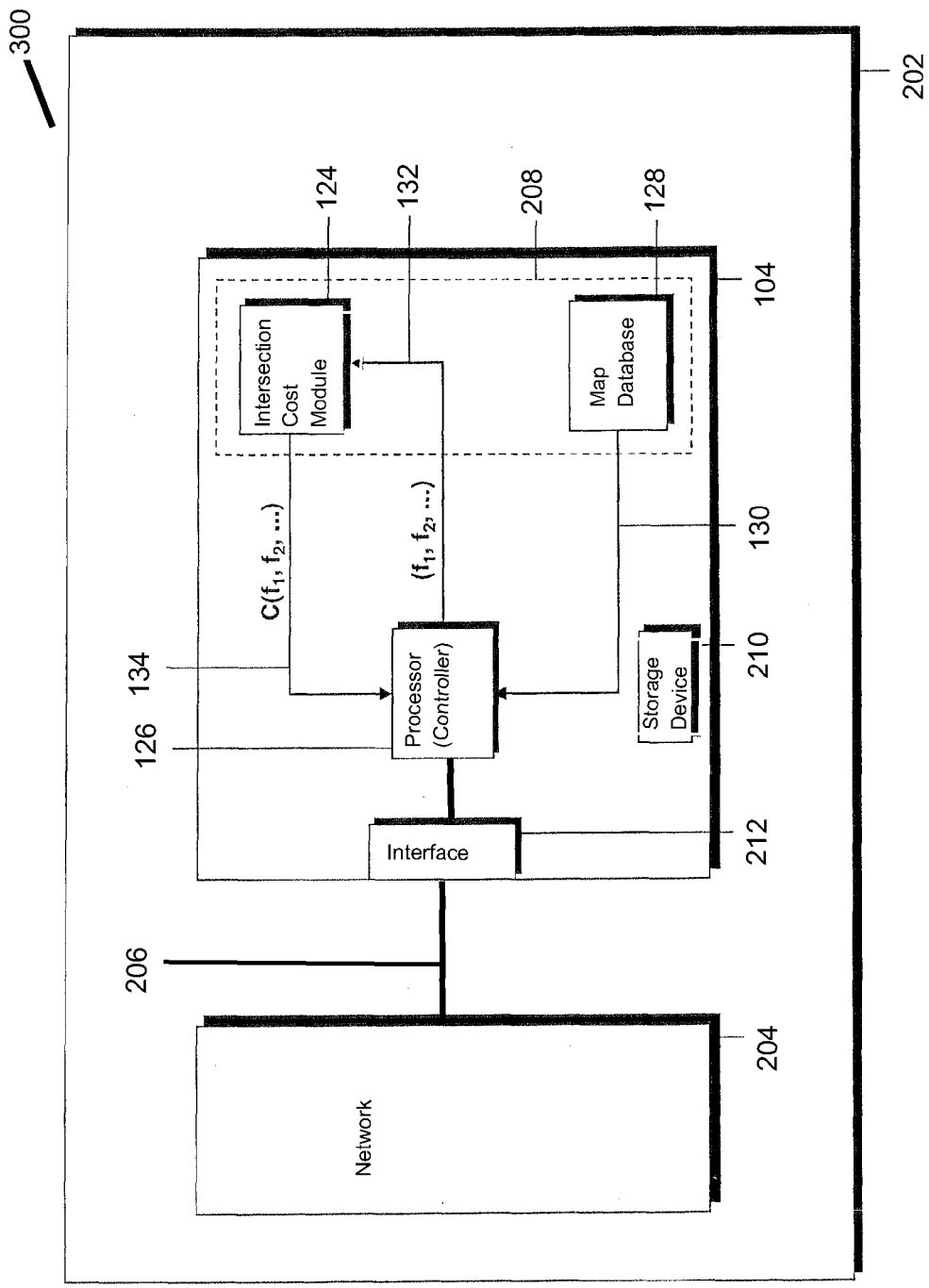
FIG. 3 is a schematic block diagram of the navigation unit of FIG. 2 that is operative to perform a route search in accordance with an example of an implementation of the invention.

In FIG. 3, a schematic block diagram 300 of the navigation device 104 of FIG. 2 that is operative to perform a route search in accordance with an example of an implementation of the invention is illustrated. The navigation device 104 when operative to adjust parameters of the intersection cost module 124. The processor 126 receives driving data 206 from the vehicle board network 204 via an interface 212. The driving data 206 may include, for example, a speed or fuel consumption rate, respectively as a function of time. Additional information, such as information on a current location, may be supplied as driving data 206, or may be directly retrieved from a positioning device, such as GPS or other similar positioning devices. The processor 126 may analyse the driving data 206 to identify characteristics of, for example, a speed profile when the vehicle passes an intersection. The intersection area may be identified based on the driving data 206 and/or by matching position data with the information on the location of intersections provided by the map database 128 or both position data and map database 128 data. The identified characteristics may be, for example, a total time delay or total fuel consumption associated with the passage through the intersection.

The processor 126 extracts a set of feature values for the respective intersections. To this end, the processor 226 reads map data 130 from the map database 128. The set of feature values may be determined based at least on road classes of the road segments connected to the intersection. The processor 126 adjusts the parameters of the intersection cost module 124 based on the analysis of the driving data and the associated set of feature values. Aggregation of this information for multiple intersections may be performed prior to adjusting the values in the intersection cost module 124. The parameters of the intersection cost module 124 may be, for example, entries in a look-up table, coefficients of a mathematical expansion in the feature values, mean values or variances of probability distributions used for simulating passage of the vehicle through the junction, or similar. The processor 126 may similarly perform any of the approaches described for the processor 106 of FIG. 1, or any other of the approaches for processing the driving data and set of feature values described herein. For example, if the intersection cost module 124 is configured as a look-up table, an updated cost value 134 may be written into the look-up table.

While the operation of the navigation device 104 has been illustratively explained with reference to a scenario in which the processor 126 directly processes the driving data 206 received over the vehicle on board network 204 from multiple sensors, the data may be stored for subsequent processing. For example, the navigation device 104 may perform an update of parameters of the intersection cost module 124 only at pre-defined times or in pre-defined situations, for example when the vehicle is parked. The processor 126 may identify characteristics of the vehicle condition, such as speed profile or fuel consumption rate as a function of time, while the vehicle is driving, may store the characteristics in a storage medium, such as memory 208 or 210, for subsequent updating of the intersection cost module 125, and may utilize the stored characteristics in combination with the associated sets of feature values for junctions to update the intersection cost module 124 at an appropriate time.

When the navigation device 104 is operative to perform a route search or another task which requires information on a cost value associated with an intersection or a specific manoeuvre in an intersection. The cost value may, for example, be time delayed in a fastest route search or a total fuel consumption associated with the intersection in a search that is optimized for fuel consumption.

When the cost value associated with a junction is required, the processor 126 retrieves map data 130 from the map database 128. The map data may 130 be retrieved using a unique intersection identifier, such as intersection coordinates. Based on the map data 130, the processor 126 determines a set of feature values for the intersection. The set of feature values may be an n-tuple of feature values as previously described. The determined set of feature values may be such that it does not include a unique intersection identifier. The feature values may be indicative of a road class of an incoming road segment for a given manoeuvre at the intersection, a road class of an outgoing road segment for the manoeuvre at the intersections, and a direction change at the intersection.

The processor 126 may use the set of feature values 132 to access the intersection cost module 124 and to receive a cost value 134 from the intersection cost module 124. The cost value 134 is associated with the set of feature values 132 and, thus, with the intersection for which the processor 126 requires the cost value. Various implementations for accessing the intersection cost module 124 may be provided, depending on the implementation of the intersection cost module 124. For example, if the intersection cost module 124 includes a look-up table, one of the entries may be read out based on the set of features values 132. If the intersection cost module 124 includes a mathematical approach, the feature values 132 may be input thereto, and the intersection cost module 124 may output the cost value associated with the set of feature values.

Figure 4:
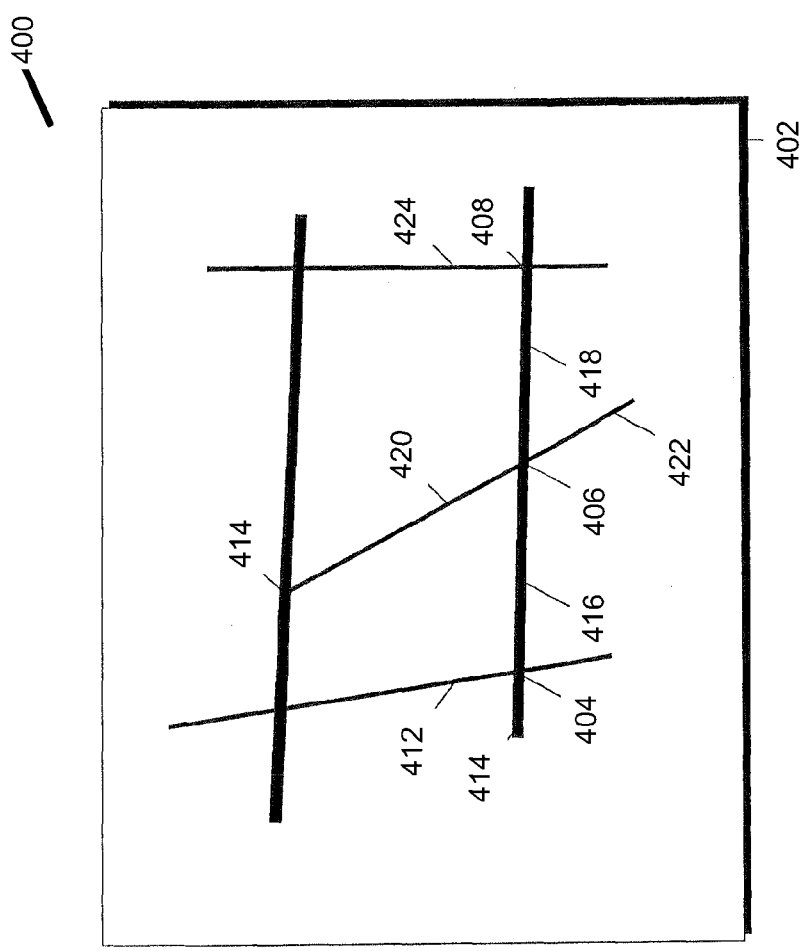
FIG. 4 is a diagram of a portion of a road network in accordance with an example of an implementation of the invention.

Turning to FIG. 4, a diagram 400 of a portion of a road network 402 in accordance with an example of an implementation of the invention is illustrated. The road network 402 may include junctions 404-410 and road segments 412-424. The road segments 414-418 indicated by thicker lines represent more important roads according to a road classification, and the road segments 412, 4120-424 indicated by thinner lines represent less important road according to the road classification.

Driving data is recorded while a vehicle drives through a plurality of intersections of the road network. For example, the vehicle may pass from road segment 412 into road segment 416 at intersection 404, thereby making a left turn from a less important road segment into a more important road segment, the importance being specified by the classification. The vehicle may pass from road segment 416 onto road segment 418 at intersection 406, i.e., continue its travel on a street that is more important, according to the road classification, than the crossing street. The vehicle may pass from road segment 418 into road segment 424 at intersection 408, making a left turn from a more important road segment into a less important road segment, the importance being specified by the classification.

A vehicle condition, such as a speed and/or fuel consumption rate as a function of time during these manoeuvres may be monitored. Characteristics of the vehicle condition may be extracted from the monitored vehicle condition. By correlating the characteristics obtained for the different manoeuvres on various intersections with sets of features values associated with the intersections, parameters for use in an intersection cost module (such 124, FIG. 3) may be set or adjusted.

Figure 5:
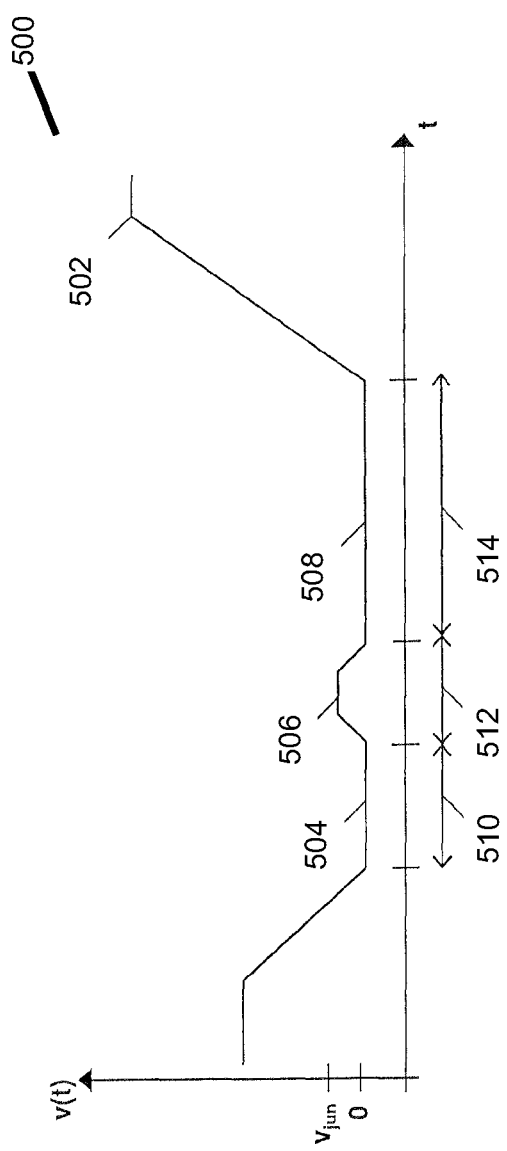
FIG. 5 is a representation of portions of driving data for illustrating an approach for providing cost information.

In FIG. 5, a representation 500 of portions of driving data for illustrating an approach for providing cost information is depicted. A speed profile 502 as it may be registered when a vehicle makes a turn from a less important road segment to a more important road segment is graphed. An example for such a manoeuvre is turning from road segment 412 into road segment 416 at junction 404 in FIG. 3. Starting from an initial speed, the vehicle decelerates, as indicated by the negative velocity ramp at the start of the graph. At 504, the vehicle makes a first stop, caused for example by a traffic light. At 506, the vehicle moves at a slow speed $v_{jun}$. At 508, the vehicle makes a second stop. Characteristics of the speed profile 502 that may be extracted include one or more of the number of stops made by the vehicle prior to passing into the outgoing road segment, the time periods 510, 514 for which the vehicle has stopped at the junction, the time period 512 for which the vehicle is travelling at low speed in the intersection area, the characteristic speed $v_{jun}$ in the intersection area, or the total time accrued in time periods 510-514.

Figure 6:
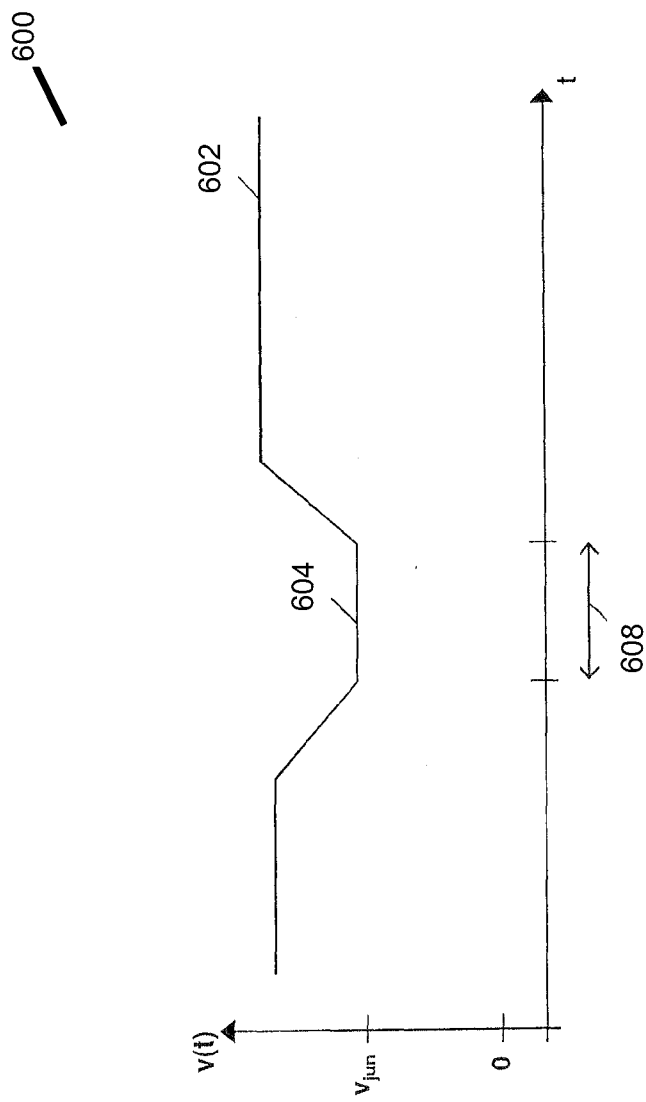
FIG. 6 is an additional representation of portions of driving data for illustrating the approach for providing cost information.

Turning to FIG. 6, an additional representation 600 of portions of driving data for illustrating the approach for providing cost information is depicted. A speed profile 602 as it may be registered when a vehicle continues to drive on an important road, i.e., a road having a high classification, at an intersection. An example for such a manoeuvre is going straight from road segment 416 into road segment 418 at junction 406 in FIG. 3. Starting from an initial speed, the vehicle decelerates, as indicated by the negative velocity ramp. For time period 604, the vehicle moves at a slower speed $v_{jun}$ in the intersection area. After a time period 608, the vehicle accelerates and continues its travel at an outgoing speed. Characteristics of the speed profile 602 that may be extracted include one or more the time period 604 for which the vehicle is travelling at low speed in the intersection area, the characteristic speed $v_{jun}$ in the intersection area, or the total time accrued while passing through the intersection area.

Figure 7:
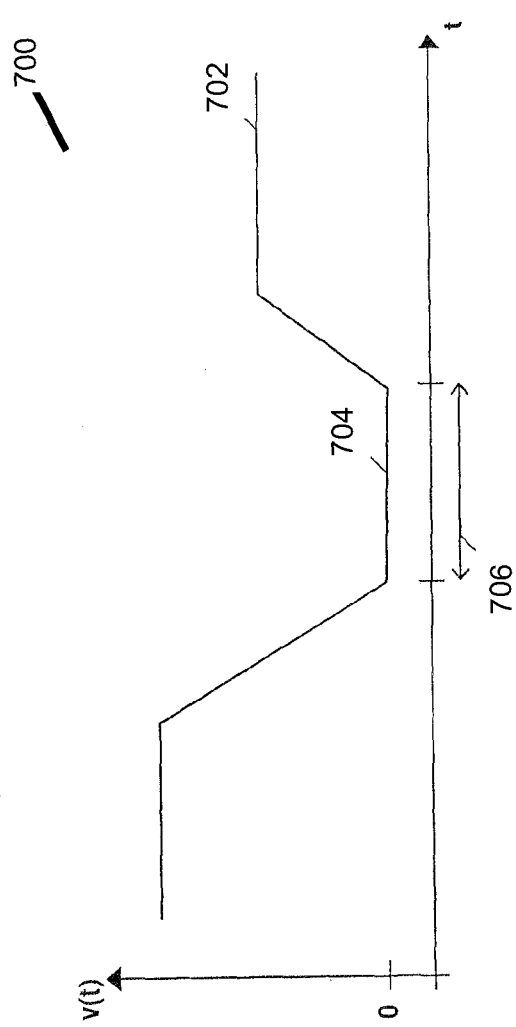
FIG. 7 is yet another representation of portions of driving data for illustrating the approach for providing cost information.

In FIG. 7, yet another representation 700 of portions of driving data for illustrating the approach for providing cost information is depicted. A speed profile 702 as it may be registered when a vehicle makes a turn from a more important road segment to a less important road segment. An example for such a manoeuvre is turning from road segment 118 into road segment 424 at junction 408 in FIG. 3. Starting from an initial speed, the vehicle decelerates, as indicated by the negative velocity ramp. For time period 704, the vehicle stops prior to passing into the outgoing road segment. After a time period 706, the vehicle accelerates and continues its travel at an outgoing speed. Characteristics of the speed profile 702 that may be extracted include one or more the time period 706 for which the vehicle stops at the intersection, or the total time accrued while passing through the intersection area.

Alternative or additional characteristics of the vehicle condition may also be established. For example, it may be sufficient to determine the total time required for the vehicle to pass the intersection. Alternatively or additionally, the total fuel consumption associated with a manoeuvre for the passage through an intersection may be determined. If no direct information on fuel consumption rate is available, the information on the fuel consumption may be determined based on a speed profile, using data associated with the type of vehicle model.

The driving data indicative of the vehicle behaviour upon passage through intersections may not only be analyzed to establish characteristics of the speed or fuel consumption as a function of time, but intersections may also be detected based on the driving data. A map data using position information, which are obtained using a positioning system such as GPS, may additionally or alternatively be employed to identify when a vehicle is passing through intersections.

Figure 8:
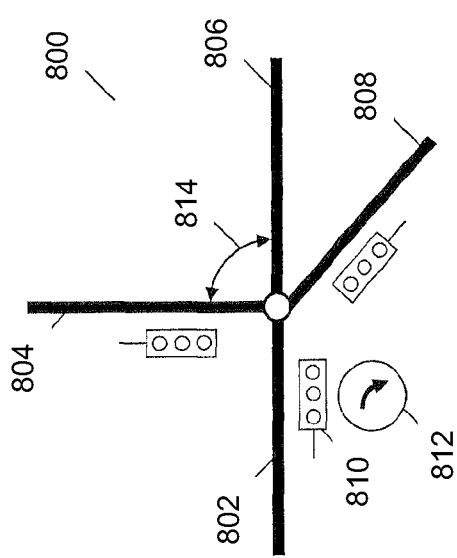
FIG. 8 is a schematic diagram of a junction for illustrating the extraction of a set of feature values in accordance with one example of an implementation.

Turning to FIG. 8, a schematic representation of an intersection area 800 for illustrating how feature values indicative of an intersection may be established based on map data. Road segments 802-808 are connected to the intersection. For an intersection, the map data may include information on the road segments connected to the intersection, for example in terms of road segment identifiers or road names. The map data may include information on road classes of these road segments. The map data may further include information on the presence or absence of traffic lights 810 for the different road segments at the intersection. The map data may further include information on turning restrictions, as schematically illustrated at 812. The map data may further include information on the orientation of road segments at the intersection. Based on this information on the orientation, angles enclosed by road segments may be determined, as illustrated at 814. The map data may further include information on a traffic pattern on the road segments connected to the intersection.

Based on this information derivable from the map database, a set of feature values may be generated for an intersection, or for a particular manoeuvre at an intersection. For illustration, in addition to feature values that are determined based on road classes of road segments connected to the intersection and based on information associated with a direction change associated with a manoeuvre on the intersection, the set of feature values may include additional feature values which are indicative of a traffic pattern on the incoming or outgoing road segment, or the presence of a traffic light at the incoming road segment.

By utilizing sets of features values which are n-tuples with n greater than three, more features associated with various types of intersections may be taken into account when adapting the parameters for use in the intersection cost model.

Figure 9:
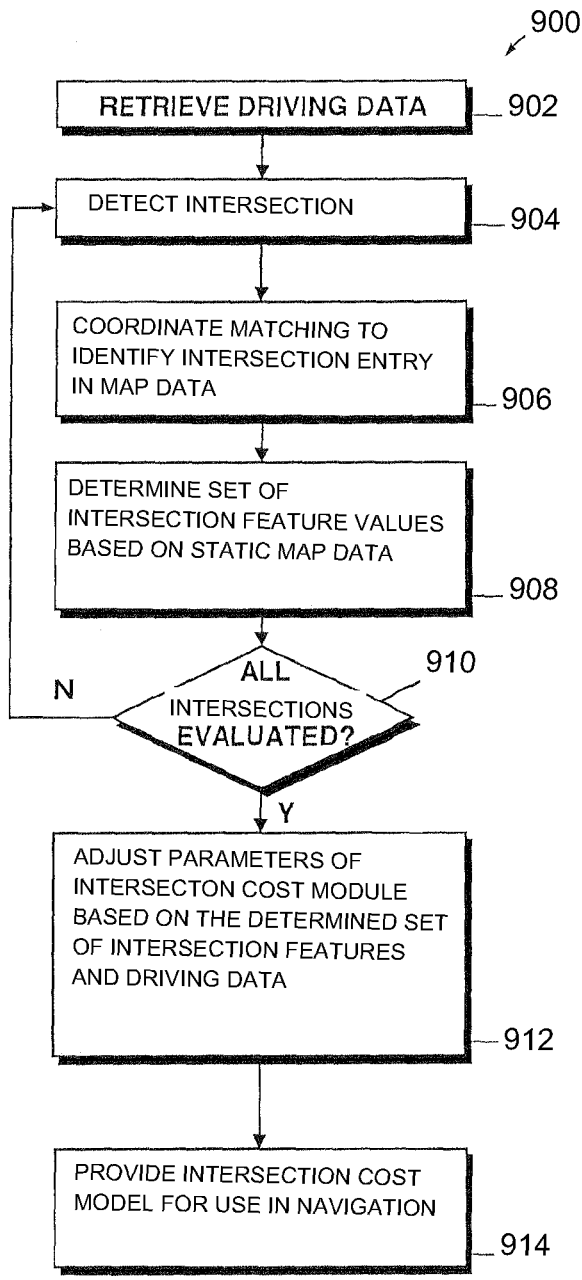
FIG. 9 is a flow diagram representation of an approach for providing cost information for intersections in accordance with one example of an implementation.

In FIG. 9, a flow diagram representation 900 of an approach for an intersection cost module for intersections in accordance with an example of an implementation is depicted. The approach may be performed by the processor 106 of the computing device 102 of FIG. 1. The approach may also be performed by the processor 126 of the navigation device 104 of FIG. 2 or in separate logic or circuits as 118 in FIG. 1 and 124 in FIG. 2.

At 902, driving data is retrieved. The driving data may include information on a vehicle condition upon passage through intersections of a road network. The vehicle condition may include a speed recorded as a function of time, or a fuel consumption recorded as a function of time. The driving data may be retrieved directly from a vehicle via an onboard network or from a storage unit in which a historical log file is stored.

At 904, passage through an intersection is detected. Passage through an intersection may be detected based on significant deceleration or stops, which can be established based on the driving data. Passage through an intersection may also be detected by map matching using position information and information on the location of intersections determined based on map data. Detecting the intersection may include identifying a time window in which the vehicle condition is affected by the intersection. Threshold comparisons may be performed to identify the time window.

At 906, coordinate matching may be performed to identify an intersection entry in the map data that corresponds to an intersection for which driving data is available.

At 908, the set of feature values associated with the intersection may be determined based on map data. The set of feature values may be determined based on static map data. The set of feature values may be determined based on information associated with classes of road segments connected to the intersection and/or based on the directions of the road segments.

At 910, it is determined whether the driving data include information on the vehicle condition for yet further passages through intersections, which are to be utilized for adjusting the parameters of the intersection cost model. If driving data for other passages through intersections are available, the approach reverts to step 904. Otherwise, the approach continues at 912.

At 912, parameters in the intersection cost module may be adjusted. This may be done based on characteristics of the driving data for passage through different intersections and the corresponding set of feature values for the respective junction. The characteristics of the driving data may include, for each intersection for which steps 904-908 are performed, one or more of information on a total number of times the vehicle has to stop prior to entering the outgoing road segment, the total time spent at the intersection, the total fuel consumption incurred at the intersection, or a characteristic velocity decrease associated with the intersection. The parameters of the intersection cost module may be adjusted by utilizing the characteristics of the vehicle condition determined based on the driving data, which are correlated with intersection feature values determined based on the map data. The characteristics derived from the driving data and the associated set of feature values for the respective intersection and manoeuvre may be aggregated for a plurality of intersections prior to adjusting the parameters in the intersection cost module. Different techniques may be utilized to adjust the parameters of the intersection cost module, such as regression analysis or simulation techniques.

At 914, the intersection cost module may be provided results for use in navigation. When information on a cost value, such as a time delay or additional fuel consumption incurred when performing a given manoeuvre at a given intersection, is required, the intersection cost module may be accessed to provide this information.

While an approach is illustrated in FIG. 9 in which characteristics of driving data and associated sets of feature values may be aggregated for multiple intersections prior to adjusting the set of parameter values, the adjusting at step 912 may also be performed whenever, for example, a time delay or total fuel consumption incurred upon passage through an intersection and the associated set of feature values are determined. In yet other implementations, the characteristics of the driving data may be evaluated for a plurality of manoeuvres at intersections, which are associated with the same set of feature values, and this information may combined to adjust the parameters in the intersection cost module.

Figure 10:
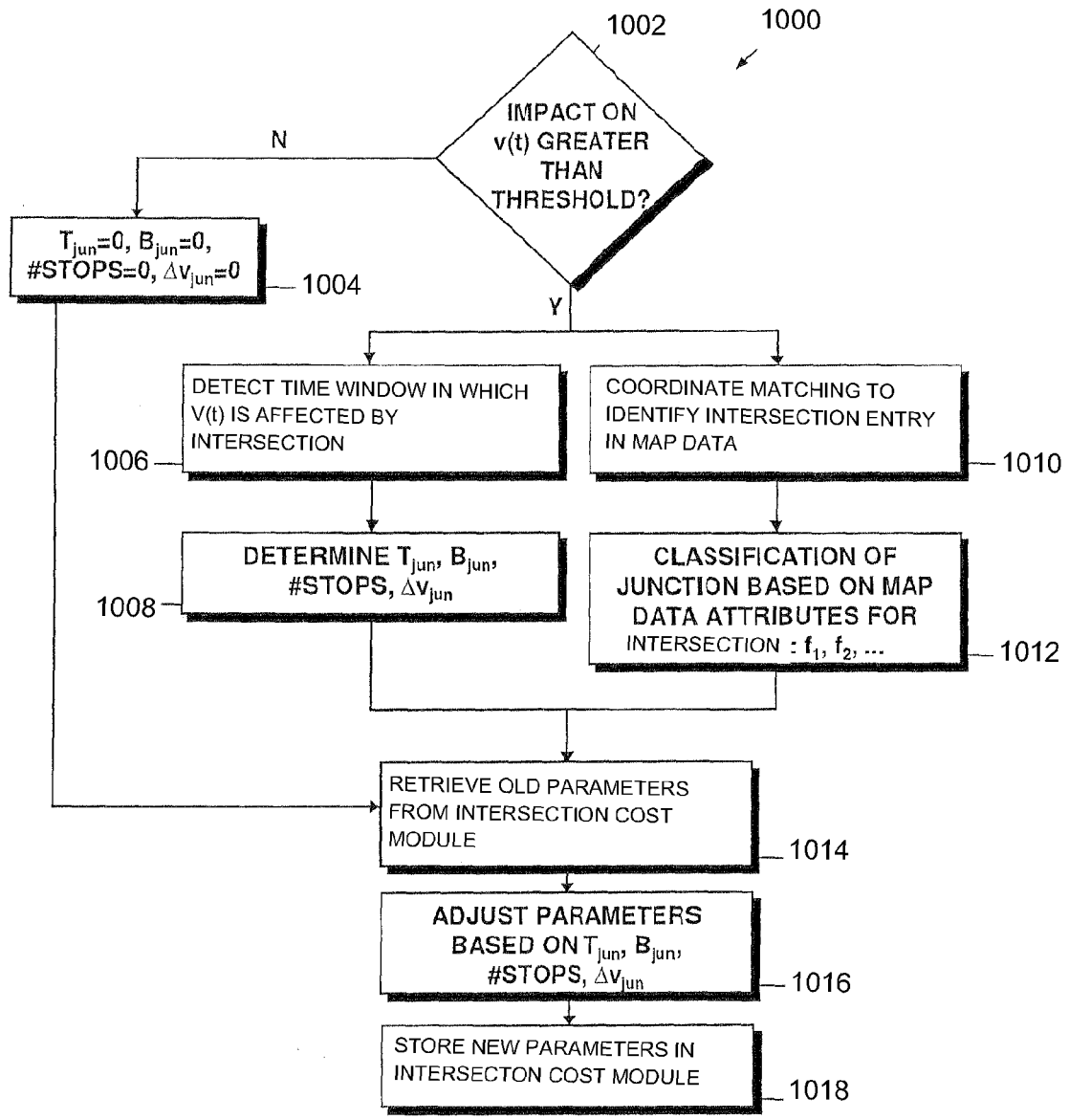
FIG. 10 is a flow diagram representation 1000 of an approach for adjusting parameters of in an intersection cost module in accordance with an example of an implementation of the invention.

Turning to FIG. 10, a flow diagram representation 1000 of an approach for adjusting parameters of in an inter section cost module (such as 118, FIG. 1 and 124, FIG. 2) in accordance with an example of an implementation of the invention is depicted. The approach may be performed by the processor 106 of the computing device 102 of FIG. 1. The method may also be performed by the processor 126 of the navigation device 104 of FIG. 2. The approach 1000 may be utilized to implement steps 904-912 shown in FIG. 9.

At 1002, it may be determined whether the intersection significantly affects the driving condition of the vehicle. In an implementation, a speed change in the intersection area may be compared to a threshold to determine whether the intersection affects the driving condition in a manner that is significant for the intersection cost module.

If it is determined at 1002 that the vehicle condition, for example the vehicle speed, is not significantly altered in the intersection area, the flow diagram proceeds to step 1004. At 1004, the values of one or more characteristics associated with passage through the intersection are set. The one or more characteristics may include one or more of the time delay $T_{jun}$ incurred at the intersection, the additional fuel consumption $B_{jun}$ incurred at the intersection, the number of times the vehicle stops (#STOPS) at the intersection, and the speed decrease $\Delta v_{jun}$ in the intersection area. At step 1004, the values of these characteristics may be set so as to indicate that the intersection does not significantly affect the vehicle speed profile. In one example, the values of these characteristics may be set to zero (initialized) before the approach proceeds to step 1014.

If it is determined at 1002 that the vehicle condition, for example the vehicle speed, is significantly altered in the intersection area, the approach proceeds to 1006-1012. While these steps are illustrated as being partially performed in parallel, they may also be performed in a sequential manner.

At 1006, a time window is determined in which the vehicle condition, for example the speed, is affected by the intersection. A speed change may be compared to a threshold to determine the time window. In an implementation, the time window in which the vehicle condition is affected by the intersection may be determined by identifying portions of a speed profile at which the vehicle is travelling on an incoming or outgoing road segment and has an acceleration or deceleration smaller than a threshold. Position information may be provided by a positioning system, such as GPS, and may be combined with the driving data to establish the time window in which the intersection affects the vehicle condition.

At 1008, the driving data in the time window may be evaluated to establish one or more characteristics associated with the manoeuvre in the intersection, which is represented by the driving data. The one or more characteristics may include one or more of the time delay $T_{jun}$ incurred at the intersection, the additional fuel consumption $B_{jun}$ incurred at the intersection, the number of times (#STOPS) the vehicle stops at the intersection, and the speed decrease $\Delta v_{jun}$ in the intersection area. These characteristics may be derived by evaluating the driving data. For illustration, the time delay $T_{jun}$ incurred at the intersection may be determined based on the length of the time window determined at 1006. The fuel consumption $B_{jun}$ incurred at the intersection may be determined based on the fuel consumption rate integrated over the time window determined at 1006.

In implementations, the time delay $T_{jun}$ or fuel consumption $B_{jun}$ incurred at the intersection may further be determined based on costs associated with travelling on the incoming and outgoing road segments. To this end, the section of the incoming road segment and the section of the outgoing road segment that correspond to the intersection area as identified at 1006 may be determined. Thereby, it may be determined that the speed profile of the vehicle is affected by the intersection over a certain length of the incoming road segment and over a certain length of the outgoing road segment. The time delay $T_{jun}$ incurred at the intersection may be set equal to the length of the time window determined at 1006 minus the time delay that the vehicle would incur when traversing the length of the incoming road segment, as determined based on the road segment costs according to a travel time cost model, and minus the time delay that the vehicle would incur when traversing the length of the outgoing road segment, as determined based on the road segment costs according to a travel time cost historic data or model. Thereby, double counting of costs in subsequent route search may be avoided. Similarly, when determining the fuel consumption $B_{jun}$ incurred at the intersection, the fuel consumption rate integrated over the time window determined at 1006 may be corrected for the costs, in terms of fuel consumption, which are associated with the portions of the incoming and outgoing road segments located in the intersection area.

In parallel, in the current example, to the detecting and determining at 1006 and 1008, at 1010, a coordinate matching is performed to identify an entry in the map data that corresponds to the intersection through which the vehicle has passed in the time window. At 1012, a classification of the intersection is performed based on the entry in the map data. The classification may be performed based on static map data. Map data attributes associated with the intersection may be retrieved to determine a set of feature values. After the characteristics of the vehicle condition associated with passage through the junction and the set of feature values have been determined, the approach proceeds to 1014.

At 1014, the old parameters in the intersection cost module are retrieved. In an implementation, the old parameter may be retrieved for the set of feature values determined at 1012. The old parameters may include a cost value returned by the intersection cost module when queried by the set of feature values determined at 1012, and information associated with a reliability of this value. The information on the reliability may, for example, be indicative of a number of intersections for which the driving data have been analyzed to arrive at the cost value that is presently provided by the intersection cost module.

At 1016, the parameters of the intersection cost module are adjusted based on the characteristics determined based on the driving data. For illustration, if the intersection cost model provides travel time information, the cost value indicative of a time delay incurred when performing a given manoeuvre on the junction may be adjusted based on one or more of the time delay $T_{jun}$, the number of times the vehicle stops at the intersection, or the speed decrease $\Delta v_{jun}$ in the intersection area, as determined at 1008 or 1004, respectively. The updating may include computing a weighted average of the old cost value and the determined characteristics. For illustration, if the intersection cost module provides travel time information, a weighted average of the old cost value and $T_{jun}$ may be computed, the weighting factor being determined based on the reliability information. The reliability information may be adjusted accordingly to account for the fact that additional driving data has been evaluated to arrive at the new cost value. In an example of an implementation, if the reliability information is indicative of the number of intersections for which the driving data have been analyzed, this value may be incremented by 1. At 1018, the new parameters in the intersection cost module may be stored. The various acts 1002-1018 may be iteratively performed for a plurality of intersections.

Figure 11:
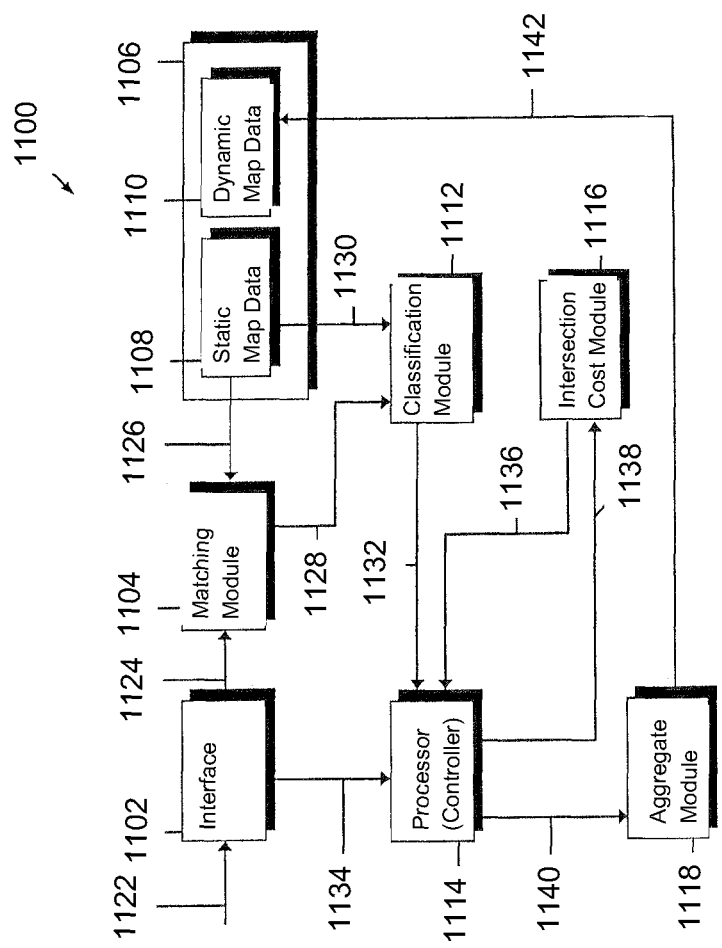
FIG. 11 is a schematic functional block diagram of a device for providing cost information for intersections in accordance with an example of an implementation.

In FIG. 11, a schematic functional block diagram of a device 1100 for providing cost information for intersections in accordance with an example of an implementation is shown. While separate functional blocks are shown for illustration, the functions provided by these blocks may be combined in one physical entity. For illustration, the operation of a matching module 1104, a classification module 1112, a processing module 1114 and an aggregation module 1118 may all be performed by the processor 106 of the device 102 of FIG. 1 or the processor 126 of the navigation device 104 of FIG. 2.

The device 1100 includes an interface 1102, the matching module 1104, a map database 1106 storing static map data 1108 and dynamic map data 1110, the classification module 1112, the processing module 1114, an intersection cost module 1116, and the aggregation module 1118.

Driving data 1122 is received at the interface 1102. The driving data 1122 include information on a vehicle condition upon passage through intersections. The driving data 1122 may include a speed and/or fuel consumption rate, respectively as a function of time. Additional information may be included in the driving data, such as position information specifying the vehicle position. Time and day stamps may be included in the driving data 1122 or information on the time and day may be retrieved from other devices when it is desired to account for dynamically changing traffic situations. Further, traffic information signals may also be retrieved.

The matching module 1104 retrieves position information 1124, which may include vehicle coordinates, from the driving data 1122. The matching module 1104 may also retrieve information 1126 on intersection coordinates from the static map data 1108. Matching may then be performed to determine the identifier for an intersection through which the vehicle has passed. The identifier is such that it allows the entry for the intersection to be accessed in the map database 1106.

The classification module 1112 receives the intersection identifier 1128 from the matching module 1104. Based on the intersection identifier 1128, the classification module retrieves the intersection attributes 1130 from the static map data 1108 and the dynamic map data 1110. The intersection attributes may include information on crossroads, on road classes, on the presence or absence of traffic signs or on turning restrictions. Based on the intersection attributes 1130, a set of feature values 1132 may be determined and provided to the processing module 1114. Additional queries may be performed to determine the set of feature values 1132. For illustration, the database 1106 may be queried using the time and day information to retrieve information on traffic patterns for incoming and outgoing road segments.

The processing module 1114 determines characteristics of a vehicle condition upon passage through the intersection. To this end, the processing module 1114 analyzes information on a vehicle condition 1134 to determine a measurement-based cost value, such as a total time required for passage from the incoming to the outgoing road segment at the intersection or a total fuel consumption incurred at the intersection.

The processing module 1114 retrieves the current parameters 1136 from the intersection cost module 1116. The retrieving of the parameters 1136 may be performed based on the set of feature values 1132. The processing module 1114 computes new parameters for the intersection cost module based on the analysis of the information on the vehicle condition 1134 and the parameters 1136, which have been retrieved based on the set of feature values 1132. A weighting may be performed which takes into account the amount of driving data from which the parameters 1136 of the intersection cost module 1116 have been determined. The processing module 1114 then sets the new parameters 1138 in the intersection cost module 1116 by sending the new parameters 1138 to the intersection cost module 1116.

The processing module 1114 may also provide results 1140 of the analysis performed on the driving data to the aggregation module 1118. The results 1140 may include information that is suitable for storage in the map database 1106 for subsequent use. For illustration, it may be desirable to store information on a specific intersection, through which the vehicle passes frequently, in the map database 1106. The aggregation module 1118 aggregates the information and writes adaptive map information 1142 into the dynamic map data 1110 of the map database 1106.

The processing module 1114 may perform various procedures in order to adjust parameters in the intersection cost module 1116. In an example of an implementation, the processing module 1114 may perform a regression analysis on data collected for plural intersection, in the parameter space spanned by the possible sets of feature values. In another example of an implementation, the processing module 1114 may perform stochastic simulations to model the speed profile of the vehicle in the intersection.

In some approaches and devices for providing cost information for intersections, stochastic simulations may be performed. Multiple simulations may be performed for intersections and manoeuvres that are classified to have a set of feature values, and the simulation process may be repeated for different possible sets of feature values. For each one of the simulations, at least one kinematic quantity is chosen according to a probability distribution that is established based on the driving data obtained for intersections that have a given set of feature values.

Figure 12:
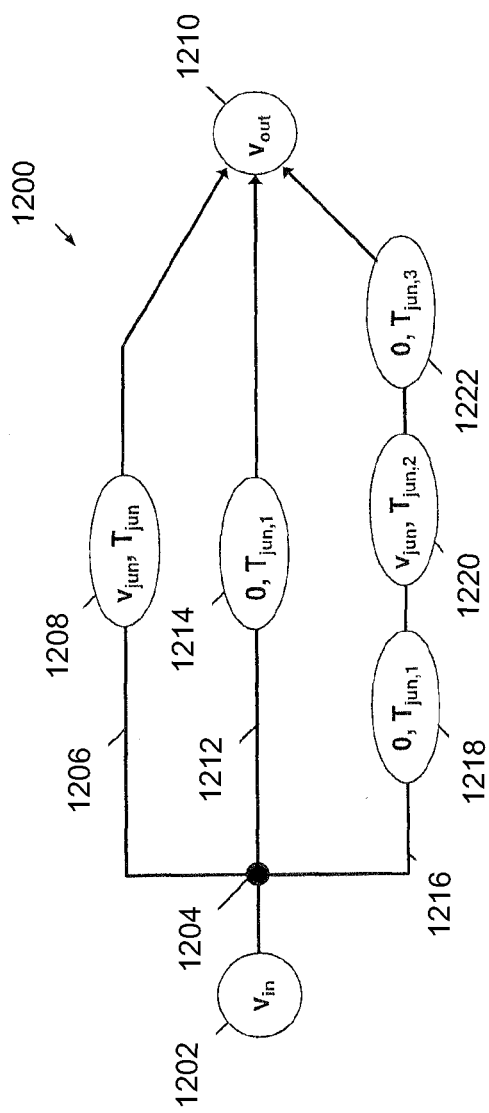
FIG. 12 is a diagram illustrating a simulation of vehicle behaviour upon passage through an intersection performed by the device for providing cost information for intersections of FIG. 11.

Turning to FIG. 12, a diagram 1200 illustrating a simulation of vehicle behaviour upon passage through an intersection performed by the device 1100 for providing cost information for intersections of FIG. 11. A time delay or fuel consumption incurred at the intersection may be simulated over different incoming speeds, outgoing speeds, numbers of times the vehicle has to stop, averaged minimum speeds in the intersection area while the vehicle is driving in the intersection area, and stop times in the intersection area. The parameters for the simulations may be determined based on the driving data, i.e., monitored vehicle behaviour. For each one of the indicated quantities, a mean value, and possibly variance, can be determined based on the driving data that represent plural passages through intersections associated with the specific set of feature values.

At 1202, an incoming speed may be selected according to a probability distribution of incoming speeds, or may be set to a fixed value taken from information in the map data on the incoming road segment. A stochastic modelling is performed for passage through the intersection having the set of feature values, in which different velocity profiles are generated in a stochastic manner but using realistic physical assumptions. In order to model realistic velocity profiles, a number of times the vehicle stops at the junction and/or other input parameters describing the kinetics of the vehicle are selected according to random distributions.

At 1204, a "number of stops" is selected according to a probability distribution for the number of stops. Depending on whether zero stops, one stop, two stops etc. are selected according to probability distribution at 1204, a simplified speed profile will be simulated in one of paths 1206 corresponding to zero stops, 1212 corresponding to one stop, 1216 corresponding to two stops etc. In an implementation, the simplified speed profile is computed assuming that the vehicle has known acceleration and deceleration, and that it is driving with a characteristic minimum speed in between two stops in the intersection area after having accelerated or decelerated to that speed.

The parameters of the random distribution, such as the mean or variance or other parameters, may be set based on measured driving data. For illustration, a mean of the probability distribution for the incoming velocity may be set to be equal to a mean of measured incoming velocities for the intersection having the respective set of feature values. Similarly, the variance of the probability distribution may be set to be equal to the variance of measured values for the respective quantity, as represented by the driving data.

For the simulation in the path 1206 corresponding to zero stops, a characteristic minimum speed in the junction area $v_{jun}$ indicated at 1208 is selected according to a probability distribution for minimum speeds, and time duration $T_{jun}$ for going at the minimum speed is selected according to another probability distribution. An outgoing speed 1210 may be selected according to yet another probability distribution, or may be set to a fixed value taken from information in the map data on the outgoing road segment. The speed profile and/or total time required for decelerating from the incoming speed to the randomly selected $v_{jun}$, travelling with $v_{jun}$ for the randomly selected time period $T_{jun}$, and accelerating to $v_{out}$ may then be readily computed. Using a vehicle model which provides information on a fuel consumption rate as a function of speed, the total fuel consumption associated with this process may also be estimated. Information on acceleration profiles, if available, may also be supplied to a vehicle model so as to obtain a more realistic estimate of the total fuel consumption.

For the simulation in the path 1212 corresponding to one stop, a time duration $T_{jun,1}$ for which the vehicle stops prior to passing the intersection, indicated at 1214, is selected according to a probability distribution for such stop times. The outgoing speed 1210 may be selected according to yet another probability distribution, or may be set to a fixed value taken from information in the map data on the outgoing road segment. The speed profile and/or total time required for decelerating from the incoming speed to speed 0, waiting for the randomly selected time period $T_{jun,1}$ prior to continuing travel, and accelerating to $v_{out}$ may then be readily computed. Using a vehicle model which provides information on a fuel consumption rate as a function of speed, the total fuel consumption associated with this process may also be estimated.

For the simulation in the path 1216 corresponding to two stops, time durations $T_{jun,1}$ and $T_{jun,3}$ for which the vehicle stops prior to passing the intersection, indicated at 1218 and 1222, may respectively be selected according to a probability distribution for such stop times. Similarly, a characteristic speed $v_{jun}$ at which the vehicle travels in between the two stops, indicated at 1220, is selected according to a probability distribution for minimum speeds, and a time duration $T_{jun,2}$ for which the vehicle travels between the stops is selected according to another probability distribution. The outgoing speed 1210 may be selected according to yet another probability distribution, or may be set to a fixed value taken from information in the map data on the outgoing road segment. The speed profile and/or total time required for decelerating from the incoming speed to speed 0, waiting for the randomly selected time period $T_{jun,1}$ prior to continuing travel, accelerating to $v_{jun}$ and going at this speed for the time period $T_{jun,2}$, decelerating again to speed 0, waiting for the randomly selected time period $T_{jun,3}$ prior to continuing travel, and accelerating to $v_{out}$ may then be readily computed. Using a vehicle model which provides information on a fuel consumption rate as a function of speed, the total fuel consumption associated with this process may also be estimated. Information on acceleration profiles, if available, may also be supplied to the vehicle model so as to obtain a more realistic estimate of the total fuel consumption.

Multiple simulations may be performed for any possible set of feature values. The resulting time delay and/or total fuel consumption determined in the simulations may be averaged. The mean values may be utilized to adjust the parameters in the intersection cost module. For illustration, if the intersection cost module includes a look-up table, the mean value for the time delay and/or total fuel consumption obtained from multiple simulations may be written into the look-up table, at a position determined by the set of feature values. The multiple simulations may be performed for different sets of feature values.

When the parameters in the intersection cost module are adaptively adjusted, the probability distributions utilized in the simulation procedure may be updated based on the driving data. For illustration, if it is determined that the vehicle stops a certain number of times, for example two times, prior to passing into an outgoing road segment of an intersection associated with a specific set of feature values, the probability distribution for the number of stops may be updated accordingly. Similarly, the two waiting times that are determined for this passage may be used to update the probability distribution for stop times in the intersection. Repeated simulations may be performed at a later time, using the updated probability distributions, to determine new cost values.

The intersection cost module may ultimately be used for navigation purposes onboard a vehicle. The intersection cost module may be used to obtain information on cost values for example when performing a route search.

Figure 13:
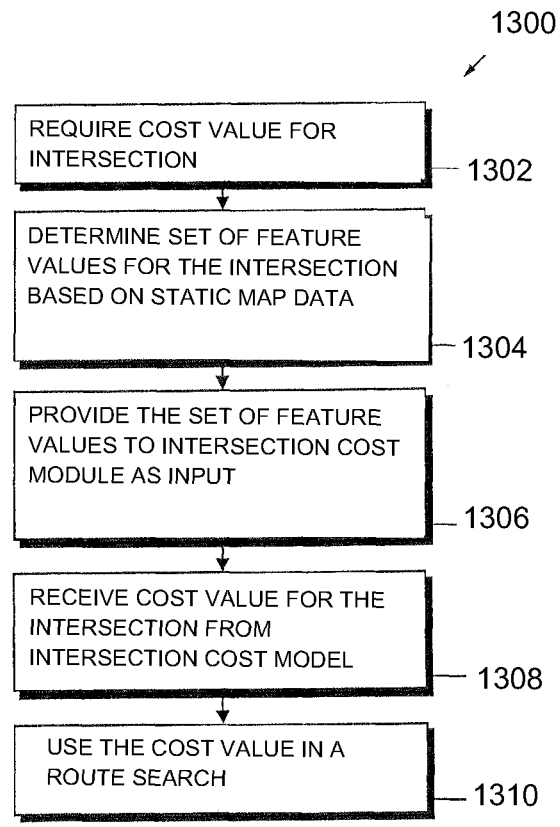
FIG. 13 is a flow diagram representation of a route search approach utilizing an intersection cost module in accordance with an example of an implementation.

In FIG. 13, a flow diagram 1300 representation of a route search approach utilizing an intersection cost module in accordance with an example of an implementation. The intersection cost module may be configured such that it provides a cost value in response to a set of feature values. The cost value may be a time delay associated with an intersection in a fastest route search, or a fuel consumption incurred at the intersection in a search for a route associated with minimum fuel consumption.

At 1302, it is determined that a cost value for a specific manoeuvre at a specific intersection is required. This may be the case, for example, in an expansion step of a route search algorithm, such as Dijkstra's algorithm or the A*-algorithm.

At 1304, the set of feature values associated with the manoeuvre at the intersection is determined. The set of feature values is determined based on static map data. The set of feature values may include a road class of an incoming road segment, a road class of an outgoing road segment, and a direction change encountered when passing from the incoming road segment to the outgoing road segment. Other feature values may be included in the set.

At 1306, the set of feature values is used to query an intersection cost module. In an implementation, the set of feature values may be used to identify an entry in a look-up table. In another implementation, the intersection cost module may perform mathematical operations based on the various feature values in the set, so as to determine an output value representing a cost value.

At 1308, a cost value for a manoeuvre and intersection associated with the set of feature values is received from the intersection cost module. The cost value may be indicative of a time delay or fuel consumption incurred when performing the manoeuvre in the intersection.

At 1310, a route search may be performed or continued, using the cost value received at 1308. The approach 1300 may be performed by a navigation device installed onboard a vehicle, or by another electronic computing device.

In other example, information in addition to the mean cost value associated with intersections having a given set of feature values may be retrieved from the intersection cost module. For illustration, information on a standard deviation of costs associated with the given manoeuvre in the intersection having the set of feature values may be received from the map database and may be utilized in the route search. This may be desirable when the total variance in costs associated with a route is to be determined.

Additional information may be retrieved prior to querying the intersection cost module. For example, information on a time of day and day, at which the vehicle is expected to pass through the intersection, may be determined to establish traffic patterns for incoming and outgoing road segments based thereon. The traffic patterns may be utilized as feature values to query the intersection cost module. Similarly, traffic information signals, such as TMC or TPEG messages, may be utilized in the process of querying the intersection cost module.

Methods and devices according to one example of an implementation have been described with reference to the drawings. Other examples may be implemented. For illustration, while methods and devices for providing cost information have been described in which certain feature values are used to train the intersection cost module and to later on access information in the intersection cost module, other sets of feature values may also be used. For example, in one example, the difference of the road class of the incoming road segment and the road class of the outgoing road segment may be used as a feature value. A discretization of a feature value indicative of a direction change may be performed. In yet other example, the feature value indicative of the direction change may be set to correspond to one of left turn, right turn, going straight and U-turn, thereby implementing a 90°-discretization. Other discretizations for the direction change may be used.

For any set of feature values or any cost value that is described herein as being associated with an intersection, it is to be understood that the set of feature values or cost value may not only depend on the intersection, but also on the specific manoeuvre in the intersection. i.e., the set of feature values or cost value may be indicative for a manoeuvre performed at the intersection. Additional or alternative information on intersections may be used as feature values. For illustration, a slope of the incoming and/or outgoing road segments may be used as feature value. A measure of a curvature of the incoming and/or outgoing road segments may be used as a feature value. The measure of the curvature may be determined in various way, e.g., by integrating the radius of curvature or its inverse along the length of the road segment. Information on traffic signs or passing restrictions when travelling from an incoming to an outgoing road segment may also be used as feature values.

In each one of the approaches, the intersection cost module may include additional information. For illustration, the intersection cost module may be configured such that, in response to a set of feature values, it does not only provide information on a cost value associated with an intersection having the set of feature values, but also provides information on a statistical distribution of the incurred costs. The information on the statistical distribution may include, for example, a standard deviation or variance of costs determined for intersections having the set of feature values. Correspondingly, adapting the parameters in the intersection cost module may include determining a standard deviation or variance of costs, for example for intersections having a given set of feature values. The approaches according to the example are well suited to determine this information, as driving data acquired for a plurality of intersections are evaluated to update the intersection cost module.

In each one of the approaches, dynamical changes in road condition may be accounted for. For example, the traffic pattern on incoming and outgoing road segment associated with a manoeuvre at a given intersection may be used as a feature value, instead of or additionally to the road classes of the incoming and outgoing road segments. Information on a time and day may be retrieved and may be utilized to query a dynamic map database which stores the traffic patterns. Traffic information messages may also be accounted for, both in the process of adjusting parameters of an intersection cost module and when using the intersection cost module for route determination. The approaches according to the example described herein may be performed in a driver-specific manner. Thereby, a learning navigation that takes into account the behaviour of different drivers may be implemented.

It will be understood, and is appreciated by persons skilled in the art, that one or more processes, sub-processes, or process steps described in connection with FIGS. 9, 10 and 13 may be performed by hardware and/or software. If the process is performed by software, the software may reside in software memory (not shown) in a suitable electronic processing component or system such as, one or more of the functional components or modules schematically depicted in FIGS. 9, 10 and 13. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method performed in a general purpose computer of providing cost information associated with intersections of a road network, comprising:
   receiving, for a plurality of intersections, driving data indicative of at least one condition of a vehicle upon passage of the vehicle through the plurality of intersections;
   determining for each intersection in the plurality of intersections a set of features values associated with the respective intersections, the set of feature values being determined based at least on
      a road class and/or traffic pattern of an incoming road segment,
      a road class and/or traffic pattern of an outgoing road segment, and
      a maneuver classification indicative of a direction change when travelling from the incoming road segment to the outgoing road segment;
   adjusting parameters associated with passage through intersections in an intersection cost module of an electronic device which provides route guidance information, the intersection cost module being configured to provide a cost value in response to receipt of a set of feature values associated with an intersection and the parameters being adjusted based on receipt of driving data and the sets of features value determined for the plurality of intersections to configure the intersection cost module for a subsequent use in at least one of route search or route guidance.

2. The method of claim 1, where determining a set of features values further includes, determining a set of feature values associated with the respective intersections based upon map data.

3. The method of claim 1, where adjusting parameters further includes, adjusting parameters indicative of a travel time.

4. The method of claim 1, where adjusting parameters further includes, adjusting parameters indicative of fuel consumption.

5. The method of claim 1, includes, determining for each intersection of the plurality of intersections, the set of feature values based at least on road classes of road segments connected to the intersection.

6. The method of claim 1, further includes, determining for each intersection of the plurality of intersections, the set of feature values based at least on traffic patterns of the road segments connected to the intersections.

7. The method of claim 1, further includes, determining for each intersection of the plurality of intersections, the set of feature values is determined based at least on directions of the road segments at the intersection.

8. The method of claim 1, further includes providing the cost value when the set of feature values is an n-tuple with n greater than or equal to 2 and the intersection cost module is configured to provide the cost value in response to receipt of an n-tuple of feature values.

9. The method of claim 1, includes, determining, for a selected set of feature values, a measurement-based cost value associated with an intersection having the selected set of feature values, wherein the measurement-based cost value is determined based on the driving data for the intersection having the selected set of feature values, and wherein the parameters in the intersection cost module are adjusted based on the measurement-based cost value.

10. The method of claim 9, wherein the driving data includes information on a speed or fuel consumption of the vehicle as a function of time, and analyzing the information on the speed or fuel consumption to determine the measurement-based cost value.

11. The method of claim 9, wherein the measurement-based cost value is determined so as to be indicative of a total time or a total fuel consumption incurred upon passage through the intersection having the selected set of feature values.

12. The method of claim 9, wherein the determining the measurement-based cost value further includes, performing plural simulations of a passage of the vehicle through the intersection having the selected set of feature values, each one of the simulations being performed based on at least one input parameter selected according to a random distribution.

13. The method of claim 9, wherein the determining a measurement-based cost value is respectively performed for a plurality of selected sets of feature values.

14. The method of claim 13, further includes performing a regression analysis on the measurement-based cost values determined for the plurality of selected sets of feature values.

15. The method of claim 1, includes receiving the driving data of the vehicle from an onboard network, and adjusting the parameters is performed onboard the vehicle.

16. The method of claim 1, includes
   retrieving traffic information signals associated with incoming and outgoing road segments of the plurality of intersections, where the traffic information signals indicating a traffic condition on the incoming and outgoing road segments upon passage of the vehicle through the respective intersection, adjusting the parameters in the intersection cost module based on the traffic information signals.

17. A computing device configured as a vehicle navigation device, comprising:
an interface configured to receive, for a plurality of intersections driving data indicative of at least one condition of a vehicle upon passage of the vehicle through the respective intersection,
a storage unit configured to store map data, and
a processor configured to determine, for each intersection of the plurality of intersections, based on the map data a set of feature values associated with the respective intersections based at least on
a road class and/or traffic pattern of an incoming road segment,
a road class and/or traffic pattern of an outgoing road segment, and
a maneuver classification indicative of a direction change when travelling from the incoming road segment to the outgoing road segment, and
to adjust parameters in an intersection cost module of an electronic device which provides route guidance information, the parameters being indicative of a travel time or fuel consumption incurred upon passage through intersections, the intersection cost module being configured to provide a cost value in response to receiving a set of feature values associated with an intersection, the processor being configured to adjust the parameters of the intersection cost module based on the driving data, received at the interface and the sets of feature values determined for the plurality of intersections to configure the intersection cost module for a subsequent use in at least one of route search or route guidance.

18. The computing device of claim 17, where the processor is a digital signal processor.

19. The computing device of claim 17, where the storage unit is a memory chip.

20. The computing device of claim 17, where the interface is a wireless interface.

21. A non-transitory computer readable media that has a plurality of machine readable instructions, that when executed result in a providing of cost information associated with intersections of a road network, the machine readable instructions comprising instructions for steps of:
receiving, for a plurality of intersections, driving data indicative of at least one condition of a vehicle upon passage of the vehicle through the plurality of intersections;
determining for each intersection in the plurality of intersections a set of features values associated with the respective intersections based at least on
a road class and/or traffic pattern of an incoming road segment,
a road class and/or traffic pattern of an outgoing road segment, and
a maneuver classification indicative of a direction change when travelling from the incoming road segment to the outgoing road segment;
adjusting parameters associated with passage through intersections in an intersection cost module of an electronic device which provides route guidance information, the intersection cost module being configured to provide a cost value in response to receipt of a set of feature values associated with an intersection and the parameters being adjusted based on receipt of driving data and the sets of features value determined for the plurality of intersections; and
providing the cost value when the set of feature values is an n-tuple with n greater than or equal to 2 and the intersection cost module is configured to provide the cost value in response to receipt of an n-tuple of feature values.

22. The non-transitory computer readable media of claim 21, where instructions for determining a set of features values further includes instructions for, determining a set of feature values associated with the respective intersections based upon map data.

23. The non-transitory computer readable media of claim 21, where instructions for adjusting parameters further includes, adjusting parameters indicative of a travel time.

24. The non-transitory computer readable media of claim 21, where instructions for adjusting parameters further includes, adjusting parameters indicative of fuel consumption.

25. The non-transitory computer readable media of claim 21, includes instructions for determining the set of feature values for each intersection of the plurality of intersections, based at least on road classes of road segments connected to the intersection.

26. The non-transitory computer readable media of claim 21, includes instructions for determining the set of feature values for each intersection of the plurality of intersections, based at least on traffic patterns of the road segments connected to the intersections.

27. The non-transitory computer readable media of claim 21, further includes instructions for determining the set of feature values for each intersection of the plurality of intersections, based at least on directions of the road segments at the intersection.

28. A method of providing cost information associated with intersections of a road network, the method being performed by an electronic device and comprising:
receiving, for a plurality of intersections, driving data indicative of at least one condition of a vehicle upon passage of the vehicle through the plurality of intersections;
determining for each intersection in the plurality of intersections a set of features values associated with the respective intersections;
adjusting parameters associated with passage through intersections in an intersection cost module, the intersection cost module being configured to provide a cost value in response to receipt of a set of feature values associated with an intersection, the set of feature values being an n-tuple with n greater than or equal to 2, and the parameters being adjusted based on receipt of driving data and the sets of features value determined for the plurality of intersections to configure the intersection cost module for a subsequent use in at least one of route search or route guidance.

29. A computing device configured as a vehicle navigation device, comprising:
an interface configured to receive, for a plurality of intersections driving data indicative of at least one condition of a vehicle upon passage of the vehicle through the respective intersection,
a storage unit configured to store map data, and
a processor configured to determine, for each intersection of the plurality of intersections, based on the map data a set of feature values associated with the respective intersections, and to adjust parameters in an intersection cost module the parameters being indicative of a travel time or fuel consumption incurred upon passage through intersections, the intersection cost module being configured to provide a cost value in response to receiving a set of feature values associated with an intersection, the set of feature values being an n-tuple with n greater than or equal to 2, the processor being configured to adjust the parameters of the intersection cost module based on the driving data, received at the interface and the sets of feature values determined for the plurality of intersections to configure the intersection cost module for a subsequent use in at least one of route search or route guidance.

30. A non-transitory computer readable media that has a plurality of machine readable instructions, that when executed result in a providing of cost information associated with intersections of a road network, the machine readable instructions comprising instructions for steps of:

receiving, for a plurality of intersections, driving data indicative of at least one condition of a vehicle upon passage of the vehicle through the plurality of intersections;

determining for each intersection in the plurality of intersections a set of features values associated with the respective intersections;

adjusting parameters associated with passage through intersections in an intersection cost module, the intersection cost module being configured to provide a cost value in response to receipt of a set of feature values associated with an intersection, the set of feature values being an n-tuple with n greater than or equal to 2, and the parameters being adjusted based on receipt of driving data and the sets of features value determined for the plurality of intersections to configure the intersection cost module for a subsequent use in at least one of route search or route guidance.

* * * * *